US010382821B1

(12) United States Patent
McCarty et al.

(10) Patent No.: US 10,382,821 B1
(45) Date of Patent: Aug. 13, 2019

(54) METHODS AND SYSTEMS FOR SELECTING A DESTINATION FOR STORAGE OF A MEDIA ASSET BASED ON WIRELESS ACCESS LIKELIHOOD

(71) Applicant: Rovi Guides, Inc., San Jose, CA (US)

(72) Inventors: Michael McCarty, Agoura Hills, CA (US); Glen E. Roe, Simi Valley, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 15/922,358

(22) Filed: Mar. 15, 2018

(51) Int. Cl.
| | |
|---|---|
| *H04N 21/45* | (2011.01) |
| *H04N 21/442* | (2011.01) |
| *G06F 3/06* | (2006.01) |
| *G06F 11/34* | (2006.01) |
| *H04N 21/2387* | (2011.01) |

(52) U.S. Cl.
CPC ....... *H04N 21/4532* (2013.01); *G06F 3/0653* (2013.01); *G06F 11/3438* (2013.01); *H04N 21/2387* (2013.01); *H04N 21/44204* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 8,582,946 B2 | 11/2013 | Craner | |
| 9,813,777 B1* | 11/2017 | Nijim | H04N 21/6587 |
| 2002/0174430 A1 | 11/2002 | Ellis et al. | |
| 2005/0251827 A1 | 11/2005 | Ellis et al. | |
| 2008/0120637 A1* | 5/2008 | Deiss | H04N 5/783 725/32 |
| 2009/0158326 A1* | 6/2009 | Hunt | G06F 3/04817 725/38 |
| 2010/0153885 A1 | 6/2010 | Yates | |
| 2011/0293251 A1* | 12/2011 | Roberts | H04N 21/23103 386/295 |
| 2012/0331106 A1* | 12/2012 | Ramamurthy | H04N 21/234327 709/218 |

* cited by examiner

*Primary Examiner* — Heather R Jones
(74) *Attorney, Agent, or Firm* — Haley Guiliano LLP

(57) ABSTRACT

Systems and methods are described for selecting storage location for a media asset. A determination is made as to whether a user device is accessing the media asset over a wireless connection (e.g., outside of the user's home location) or over a wired connection (e.g., at the user home location). When the user device is accessing the media asset over the wired connection, the following steps are performed (e.g., at the user home location). A determination is made of a likelihood of the media asset being accessed on a second user device through the wireless connection (e.g. outside of the user's house), based on a user's access tendencies. If the likelihood is greater than a threshold, the media asset is stored in a network storage. If the likelihood is not greater than a threshold, the media asset is stored in a local storage of the user device.

20 Claims, 10 Drawing Sheets

METHODS AND SYSTEMS FOR SELECTING A DESTINATION FOR STORAGE OF A MEDIA ASSET BASED ON WIRELESS ACCESS LIKELIHOOD

BACKGROUND

Modern media delivery systems are increasingly utilizing remote or cloud storage to store a user's data (including media assets) in addition to the storage found on the user device. For example, when a user requests a media asset via the user device, in addition to the local delivery of the content, the media asset may also be stored in network storage (e.g., on cloud storage). However, modern media delivery systems lack an intelligent way of selecting the proper storage location. For example, many systems attempt to store as much of the user's data in cloud storage as possible, without regard to how such data may be used. Alternatively, other systems prefer to always store the user's data on a local device. However, oftentimes it will turn out that the chosen storage is inaccessible to the user (e.g., a user may wish to access the content via wireless device while travelling). For example, if a media asset is stored in the network storage, but the user frequently pauses, rewinds or fast-forwards the media asset, it will quickly become inefficient to fetch the data from a remote storage device. In another example, a user who has stored a media asset in a home storage device, may find herself unable to access that asset wirelessly while traveling. In another example, potentially scarce cloud storage may be unnecessarily consumed (e.g., if the media asset is stored that could have been stored locally).

SUMMARY

Accordingly, to overcome the problems inherent in selection of a location for storage of media assets, systems and methods are described herein for a media guidance application that detects likelihood of a media asset being associated with an increased likelihood of trick-play requests. Once the detection is made, the system may, instead of storing the media asset on network storage, store the media asset on the local storage of the user device. In this way, when the user requests trick-play functionality, the local device will be able to handle such requests more quickly and with less latency, because it will not have to fetch the requested data from a remote network storage. Additionally, media assets that are not likely to experience a trick-play request, may safely be stored remotely, with a reduced risk of having to be unexpectedly and repeatedly fetching them from the network storage.

In some embodiments, the media guidance application may determine whether a user device is accessing the media asset over a wireless connection or over a wired connection. For example, the media guidance application may determine that the media asset data is being received over Wi-Fi or via a cellular connection. For example, the user may be watching a movie on a smartphone device over a network provided by his cellular service provider.

In some embodiments, the media guidance application may then perform several steps in response to determining that the user device is accessing the media asset over the wireless connection. In some embodiments, the media guidance application may determine whether the media asset features a set of scenes that increase a likelihood of using trick-play functions. For example, the media guidance application may have access to a database that contains data regarding how often the other users have requested trick-play functionality while watching a specific scene of the media asset. In some embodiments, the media guidance application may determine that a scene that contains a high number of commercial interruptions is likely to cause the user to request trick-play functionality. In some embodiments, the media guidance application may determine that a scene that contains a high number of sports scoring events is likely to cause the user to request trick-play functionality.

In some embodiments, in response to determining that the media asset features a set of scenes that increase the likelihood of using trick-play functions, the media guidance application may store the media asset in a local storage of the user device. For example, the media guidance application may store a movie being watched on the user's smartphone in a local memory of the user's smartphone. In this situation, if the user pauses or rewinds the movie, the data to perform such functionality will be readily available to the media guidance application, the user experience will not be interrupted and the latency will be minimized.

In some embodiments, in response to determining that the media asset does not feature a set of scenes that increase the likelihood of using trick-play functions, the media guidance application may store the media asset in a network storage. For example, the media guidance application may store a movie being watched on the user's smartphone in a remote network storage (e.g., in a cloud storage account of the user). In this situation, the video may be more easily accessible by other devices of the user. Additionally, since the user is unlikely to request a trick-play functionality for this media asset, the storage of such media asset in a remote storage is unlikely to cause latency or buffering.

In some embodiments, the media guidance application may maintain a set of trick-play metadata templates indicative of a high likelihood of trick-play requests. For example, one template may include keywords indicative of a large number of commercial interruptions. In some embodiments, such a template may include keywords "sale" or "lease," or other keywords indicative of advertainment content. In another example, a template may include keywords indicative of sports content (e.g., scoring event in sports). In some embodiments, such a template may include keywords "goal" or "touchdown," or other keywords indicative of sports content. In another example, a template may include keywords indicative of scenes found exciting by a plurality of other users. The keywords for such a template may be empirically determined. For example, the media guidance application may track which keywords in the media asset are associated with users activating trick-play functionalities.

In some embodiments, the media guidance application may provide the media asset to a user device. For example, the media guidance application may begin transmitting a movie, a video, a song, or any other media asset to a user device. In some embodiments, the media asset may be provided in response to a user request. In some embodiments, the media asset may be provided by the media guidance application automatically.

In some embodiments, the media guidance application may determine whether a user device is accessing the media asset outside of a user's home location (e.g., over a wireless connection) or at the user's home location (e.g., over a wired connection). For example, the media guidance application may determine that the media asset data is being received over a home Wi-Fi network or via a cellular connection outside of the user's home location. For example, the user may be watching a movie on a smartphone device over a network provided by his cellular service provider.

In some embodiments, in response to determining that the user device is accessing the media asset over outside of the user's home location (e.g., over the wireless connection), the media guidance application may perform several steps described below. In some embodiments, the media guidance application may compare metadata of the media asset to each of a set of trick-play metadata templates. For example, the media guidance application may determine a linguistic similarity between words found in the metadata of the media asset and keywords of each trick-play metadata template. In some embodiments, the media guidance application may express the linguistic similarity as a percentage score. In some embodiments, if the percentage score for a particular trick-play metadata template exceeds a threshold (e.g., 50%), the media guidance application may determine that the metadata of the media asset matches that template.

In some embodiments, in response to determining that the metadata of the media asset matches at least one template of the set of trick-play metadata templates, the media guidance application may store the media asset in a local storage of the user device. For example, the media asset may be stored in the local storage of the user's smartphone.

In some embodiments, in response to determining that the metadata of the media asset does not match any templates of the set of trick-play metadata, the media guidance application may store the media asset in a network storage. For example, the media asset may be stored in the cloud account of the user.

In some embodiments, in response to determining that the metadata of the media asset does not match any templates of the set of trick-play metadata, the media guidance application, may determine that the network storage has insufficient space to store the media asset. For example, the user may be running low on empty space in her cloud storage account. In some embodiments, the media guidance application, may then at least partially store the media asset in a local storage of the user device. For example, if the media asset size is 250 MB, but the user's network storage has only 150 MB of available space, the media guidance application may store 100 MB of the media asset in the local storage.

In some embodiments, in response to determining that the metadata of the media asset does not match any templates of the set of trick-play metadata, the media guidance application may determine that the network load exceeds a threshold. For example, if the network capacity is limited at 5 kb/s per second, but the transmission of the media asset to network would require 10 kb/s, the media guidance application may store one half of the media asset locally.

In some embodiments, the media guidance application may, after storing a media asset in the network storage, determine that the user has requested trick-play functions for the media asset more than a threshold number of times (e.g., more than twice.) In some embodiments, the media guidance application may then transfer the media asset from the network storage to the local storage of the user device. In some embodiments, this may reduce latency for subsequent trick-play functions requests.

In some embodiments, the media guidance application may receive a request from the user to transfer the media asset from the network storage to the local storage of the user device. For example, the user may explicitly request that the media asset be transferred to the user device. In some embodiments, the media guidance application may then transfer the media asset from the network storage to the local storage of the user device.

In some embodiments, in response to determining that the metadata of the media asset does not match any templates of the set of trick-play metadata, the media guidance application may identify a plurality of available network storage locations. For example, a user may have several network-enabled DVR devices in her house. In some embodiments, the media guidance application may identify each of the plurality of DVR devices as a plurality of available network storage locations. In some embodiments, the media guidance application may select a network storage location of the plurality of available network storage locations that has the most available space. For example, the media guidance application may determine which DVR device has the most space. In some embodiments, the media guidance application may store the media asset in the selected network storage location (e.g., on a DVR that has the most space).

In some embodiments, to overcome the problem inherent in selection of a location for user storage of media assets, systems and methods are described herein for a media guidance application that detects a likelihood of the media asset being accessed on a second user device through the wireless connection. Once the detection is made, the system may, instead of storing the media asset in a local device, store the media asset in the local storage of the network storage device. In this way, when the user requests that media asset using a second device, that media asset will be readily available. Additionally, media assets that are not likely to be accessed by a second device, may safely be stored locally (potentially preserving scarce cloud storage space), because it is unlikely that the user will ever view those media assets via a wireless connection.

In some embodiments, the media guidance application may determine whether a user device is accessing the media asset over a wireless connection or over a wired connection. For example, the media guidance application may determine that a media asset data is being received over a TV cable network. For example, the user may be watching a movie on his TV via a home Set-top-box (STB) device via a cable network provided by his cable TV provider.

In some embodiments, the media guidance application may, based on a user's access tendencies, determine a likelihood of the media asset being accessed on a second user device through the wireless connection. For example, the media guidance application may determine that the user always watches "Game of Thrones" episodes from a smartphone after recording these episodes using the home STB device. In another example, the media guidance application may determine that the user never watches the "X-Files" episodes using the smartphone. In this example, if the user begins watching another "Game of Thrones" episode using the STB, the media guidance application may determine that there is a significant likelihood (e.g., 75%) that the user will, in the future, request this episode via a second device (e.g., a smartphone).

In some embodiments, the media guidance application may determine whether the likelihood is greater than a threshold (e.g., 50%). In some embodiments, in response to determining that the likelihood is greater than the threshold, the media guidance application may store the media asset in a network storage (e.g., in a cloud storage account of the user).

In some embodiments, in response to determining that the likelihood is less than the threshold, the media guidance application may store the media asset in a local storage of the first user device (e.g., on a DVR connected to the STB of the user).

In some embodiments, the media guidance application may monitor user interaction with a plurality of media assets delivered to at least one user device to create a first set of metadata keywords indicative of a user accessing media assets outside of the user's home location (e.g., over a wireless connection). For example, every time the user requests a media asset previously viewed at the user's home location over a wired connection (e.g., via an STB located on the user's premises) using a wireless connection (e.g., via a smartphone) outside of the user's home location, the media guidance application may add the metadata of that media asset to the first set of metadata keywords. In another example, every time the user requests a media asset at the user's home location over a wired connection (e.g., via an STB) but fails to access that media asset via a wireless connection (e.g., via a smartphone) in a defined time period (e.g., one month), the media guidance application may add the metadata of that media asset to the second set of metadata keywords.

In some embodiments, the media guidance application may provide the media asset to the at least one user device. For example, the media guidance application may begin transmitting a movie, a video, a song, or any other media asset to at least one user device (e.g., user's STB). In some embodiments, the media asset may be provided in response to a user request. In some embodiments, the media asset be provided by the media guidance application automatically.

In some embodiments, the media guidance application may determine whether the at least one user device is accessing the media asset over a wireless connection or over a wired connection. For example, the media guidance application may determine that the media asset data is being received over a cable TV connection at the user's premises.

In some embodiments, in response to determining that the user device is accessing the media asset at the user's home location (e.g., over the wired connection), the media guidance application may perform several steps described below.

In some embodiments, the media guidance application may compare metadata of the media asset to the first set of metadata keywords and to the second set of metadata keywords. For example, the media guidance application may determine linguistic similarity between words found in the metadata of the media asset and keywords of each of the first set of metadata keywords and the second set of metadata keywords. In some embodiments, the media guidance application may express the linguistic similarity as a percentage score.

In some embodiments, in response to determining that metadata of the media asset matches the first set of metadata keywords better than the second set of metadata keywords, the media guidance application may store the media asset in a network storage. For example, the media guidance application may store a movie being watched via the user's STB in a remote network storage (e.g., in a cloud storage account of the user). In this situation, the movie may be more easily accessible when the user attempts to access this movie again via a smartphone outside of the user's home location.

In some embodiments, in response to determining that metadata of the media asset matches the second set of metadata keywords better than the first set of metadata keywords, the media guidance application may store the media asset in a local storage of the at least one user device. For example, the media guidance application may store a movie being watched via the user's STB in a local network storage (e.g., in a DVR that is communicatively connected to the STB). In this situation, the media guidance application may have determined not to use up cloud storage resources, because of a low likelihood of a user requesting to see this movie via wireless device (e.g., via a smartphone).

In some embodiments, the media guidance application may monitor which media assets of the plurality of media assets were accessed by the user asset outside of the user's home location (e.g., wirelessly). For example, the media guidance application may determine that the user habitually accesses episodes of the "Game of Thrones" series via a wireless device outside of the user's home location. In some embodiments, the media guidance application may then store metadata associated with media assets that were accessed by the user wirelessly from a second user device as a part of the first set of metadata keywords. For example, the media guidance application may store keywords "Game of Thrones," "fantasy," "epic" or any other keyword associated with the "Game of Thrones" series as a part of the first set of metadata keywords.

In some embodiments, in response to determining that metadata of the media asset matches the first set of metadata keywords better than the second set of metadata keywords, the media guidance application may determine that the network storage has insufficient space to store the media asset. For example, the user may be running low on empty space in her cloud storage account. In some embodiments, the media guidance application may then at least partially store the media asset in a local storage of the user device. For example, if the media asset size is 250 MB but the user's network storage only has 150 MB of available space, the media guidance application may store 100 MB of the media asset in the local storage.

In some embodiments, in response to determining that metadata of the media asset matches the first set of metadata keywords better than the second set of metadata keywords, the media guidance application may determine that the network load exceeds a threshold. For example, if the network capacity is limited to 5 kb/s per second, but the transmission of the media asset to network would require 10 kb/s, the media guidance application may store one half of the media asset locally.

In some embodiments, the media guidance application may, after storing a media asset at the network storage, determine that the user has requested trick-play functions for the media asset more than a threshold number of time (e.g., more than twice.) In some embodiments, the media guidance application may then transfer the media asset from the network storage to the local storage of the user device. In some embodiments, this may reduce latency for subsequent trick-play functionality requests.

In some embodiments, the media guidance application may receive a request from the user to transfer the media asset from the network storage to the local storage of the user device. For example, the user may explicitly request for the media asset be transferred to that user device. In some embodiments, the media guidance application may then transfer the media asset from the network storage to the local storage of the user device.

In some embodiments, in response to determining that metadata of the media asset matches the first set of metadata keywords better than the second set of metadata keywords, the media guidance application may identify a plurality of available network storage locations. For example, a user may have several network-enabled DVR devices in her house. In some embodiments, the media guidance application may identify such DVR devices as a plurality of available network storage locations. In some embodiments, the media guidance application may select a network storage location of the plurality of available network storage locations that has the most available space. For example, the media guidance application may determine which DVR device has the most space. In some embodiments, the media guidance application may store the media asset in the selected network storage location (e.g., on a DVR that has the most space).

In some embodiments, the media guidance application may modify the first set of metadata keywords and the second set of metadata keywords based on explicit user input. For example, the user may explicitly request that all TV shows and movies that are associated with the keywords "Game of Thrones" be stored in network storage (e.g., in a cloud storage account of the user). The media guidance application may then add keywords "Game of Thrones" to the first set of metadata keywords.

In some embodiments, the media guidance application may modify the first set of metadata keywords and the second set of metadata keywords based on social network data associated with the user. For example, the media guidance application may acquire social network post history of the user. In some embodiments, the media guidance application may then analyze the post history to identify keywords associated with accessing a media asset wirelessly. For example, if a post includes a line "I can't wait to watch game of thrones on my train ride," the media guidance application may add keywords "Game of Thrones" to the first set of metadata keywords.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
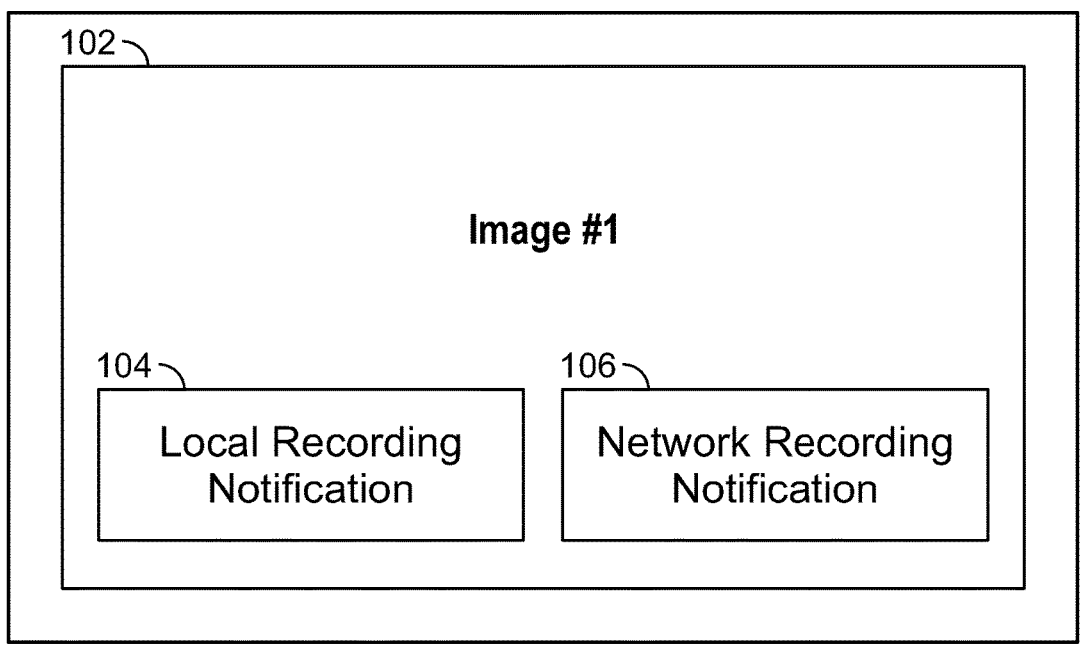
FIG. 1 shows an illustrative media guidance interface that may dynamically include or exclude a video, in accordance with some embodiments of the disclosure.

In some embodiments, the media guidance application may detect that the user is accessing a media asset (e.g., a movie or TV show episode.) In some embodiments, the media guidance application may be configured to store that media asset. For example, the media asset may be stored in a local storage (e.g., local memory of a DVR of the user, device memory of the user device, etc.) or in a network storage (e.g., in a cloud storage account by the user that a user may access using multiple devices.) Systems and methods are disclosed herein for an improved technique for selecting a storage location for the media asset (e.g., selecting between the local storage and the network storage).

In some embodiments, the media guidance application may determine that the user device is accessing the media asset at the user's home location (e.g., over the wireless connection). In this scenario, the media guidance application may determine whether the media asset includes scenes that are likely to cause the user to request trick-play functions (e.g., pause, rewind, fast-forward.) If such scenes are present, the media guidance application may store the media asset locally, because remote access to the media asset may cause delays or buffering when the user requests trick-play functions. On the other hand, if the media asset does not include scenes that are likely to cause the user to request trick-play functions, the media guidance application may store such media asset in a remote network storage.

In some embodiments, the media guidance application may determine that at least one user device is accessing the media asset at the user's home location (e.g., over the wired connection). In this scenario, the media guidance application may determine, based on a user's access tendencies, a likelihood of the media asset being accessed on the at least one user device outside of the (user's home location through the wireless connection). For example, the media guidance application may maintain a profile of media that the user generally watches on wireless devices outside of the user's home location. In some embodiments, the media guidance application may determine the likelihood by calculating how closely the metadata (e.g., title, description, transcript) of the media asset fits the profile. If the likelihood is sufficiently high, the media guidance application may store the media asset in a network storage. This way the media asset will be available to the user if he wishes to access this media asset wirelessly in the future. If the likelihood is not sufficiently high, the media guidance application may store the media asset locally, and not waste cloud storage resources, because this media asset is unlikely to be accessed wirelessly.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 shows an illustrative media guidance interface that may dynamically include or exclude a video, in accordance with various embodiments of the disclosure. In some embodiments, display 100 may display a media asset provided by the media guidance application. For example, display 100 may display image 102. Image 102 may be a part of the media asset provided by the media guidance application. In some embodiments, the media asset may be provided to display 100 of a wired device (e.g., a home entertainment system including e.g., a TV, STB and DVR) located at the user's home location or a display 100 of a wireless device (e.g., smartphone or laptop) located outside of the user's home location. In some embodiments, display 100 may display part of the media asset received over a wireless or over a wired network.

In some embodiments, while the media asset is delivered to display 100, the media guidance application may determine that the media asset should also be stored. For example, the media asset may be stored for future access by the user, or for providing trick-play functionality while the media asset is being watched.

In some embodiments, the media guidance application may determine that the media asset is being accessed outside of the user's home location (e.g., wirelessly). In some embodiments, the media guidance application may then determine whether that media asset includes scenes that are likely to cause the user to use trick-play functionality. In this case, the media guidance application may store the media asset locally. When the media asset is being stored locally, the media guidance application may cause local recording notification 104 to appear in screen 100. For example, the notification may be an icon indicative of the media asset being stored locally, or a text notification. Otherwise, the media guidance application may store the media asset in a remote network storage. When the media asset is being stored remotely, the media guidance application may cause network recording notification 106 to appear in screen 100.

For example, the notification may be an icon indicative of the media asset being stored remotely, or a text notification.

In some embodiments, the media guidance application may determine that the media asset is being accessed at the user's home location (e.g., via a wired connection). In some embodiments, the media guidance application may then determine a likelihood of the media asset being accessed on at least one user device outside of the user's home location (e.g., through the wireless connection). For example, such determination may be made based on a user's access tendencies. If the likelihood is high enough, the media guidance application may store the media asset in a remote network storage. When the media asset is being stored remotely, the media guidance application may cause network recording notification 106 to appear in screen 100. For example, the notification may be an icon indicative of the media asset being stored remotely, or a text notification. If the likelihood is not high enough, the media guidance application may store the media asset locally. When the media asset locally is being stored locally, the media guidance application may cause local recording notification 104 to appear in screen 100. For example, the notification may be an icon indicative of the media asset being stored locally, or a text notification.

Figure 2:
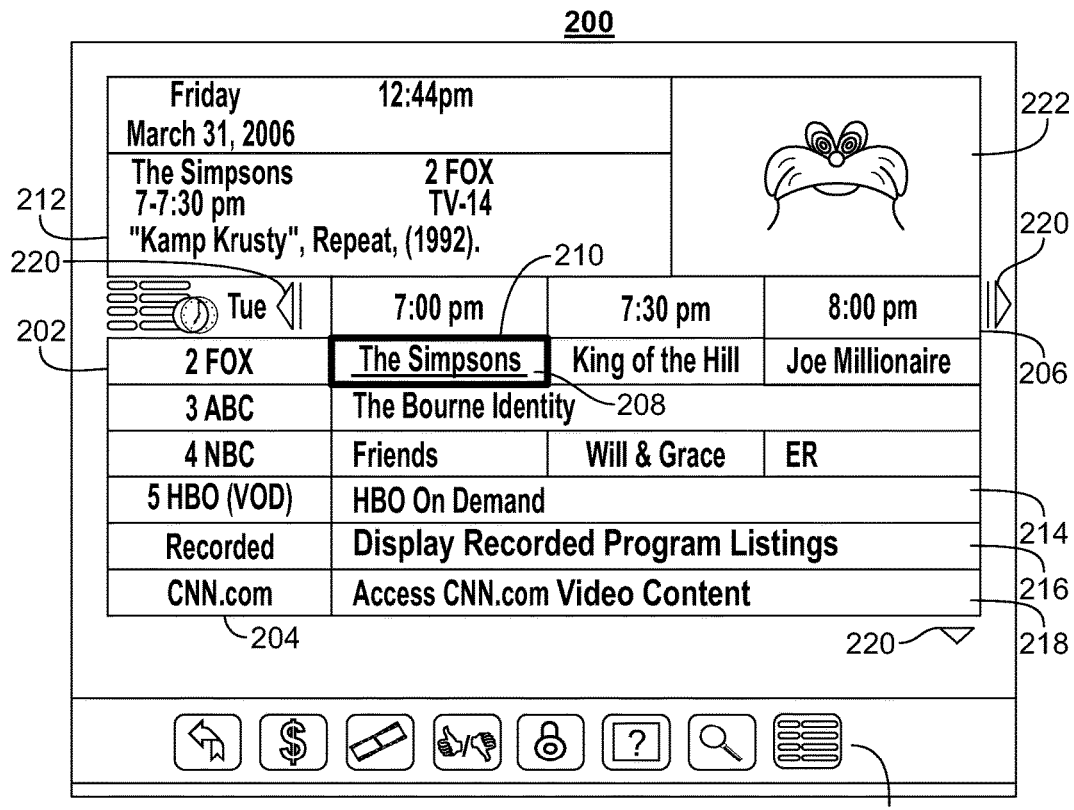
FIG. 2 shows another illustrative media guidance interface that may dynamically include or exclude a video, in accordance with some embodiments of the disclosure.
Figure 3:
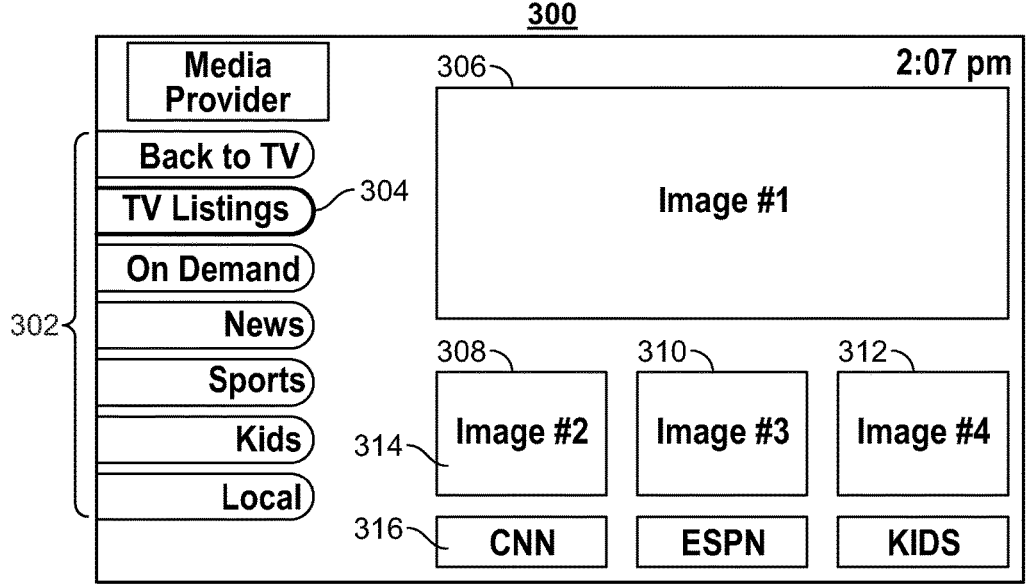
FIG. 3 shows yet another illustrative media guidance interface that may dynamically include or exclude a video, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
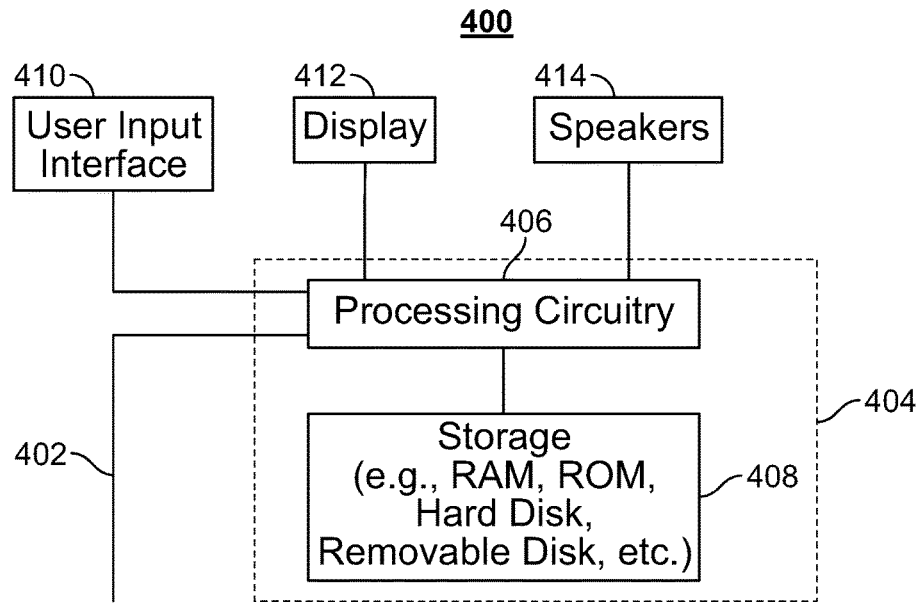
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
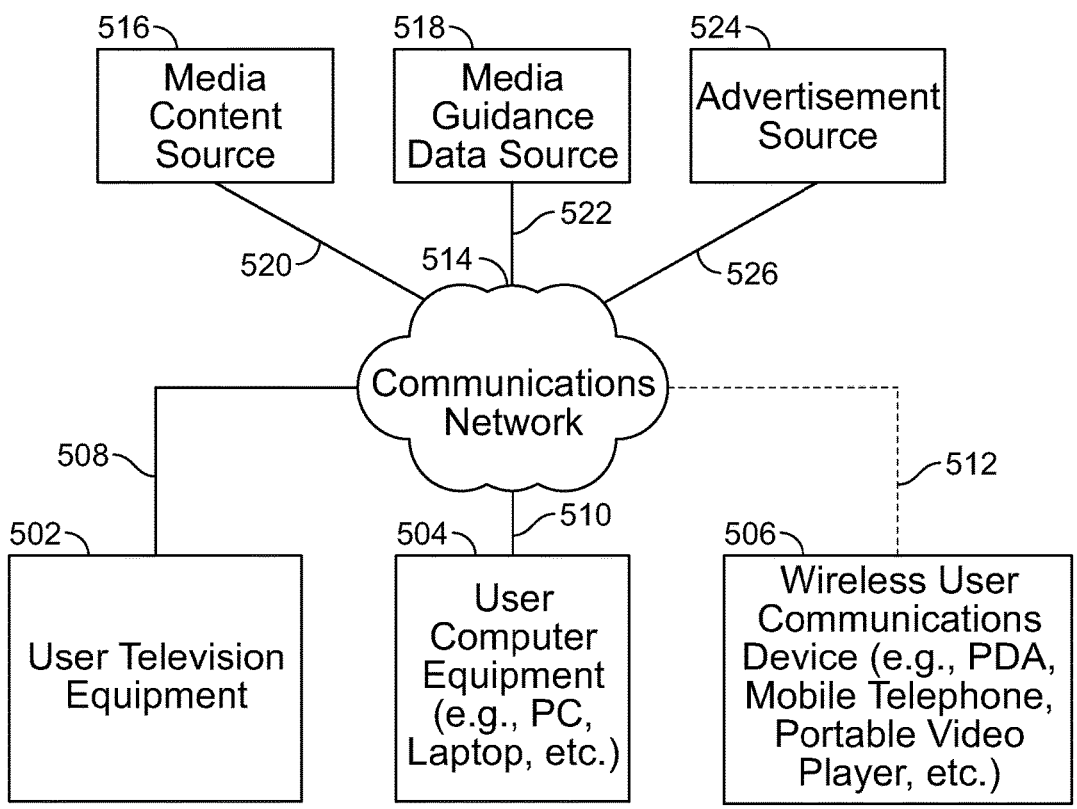
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Detailed descriptions of FIGS. 6-12 are provided below. It should be noted that processes 600-1200, or any step thereof, could be performed on, or provided by, any of the devices shown in, or described with respect to, FIGS. 4-5. For example, either process 600 or process 700 may be executed by control circuitry 404 (FIG. 4) as instructed by media guidance application(s) implemented on user equipment 502, 504, and/or 506 (FIG. 5). In addition, one or more steps of processes 600 and 700 may be incorporated into, or combined with, one or more steps of any other process or embodiment.

Figure 6:
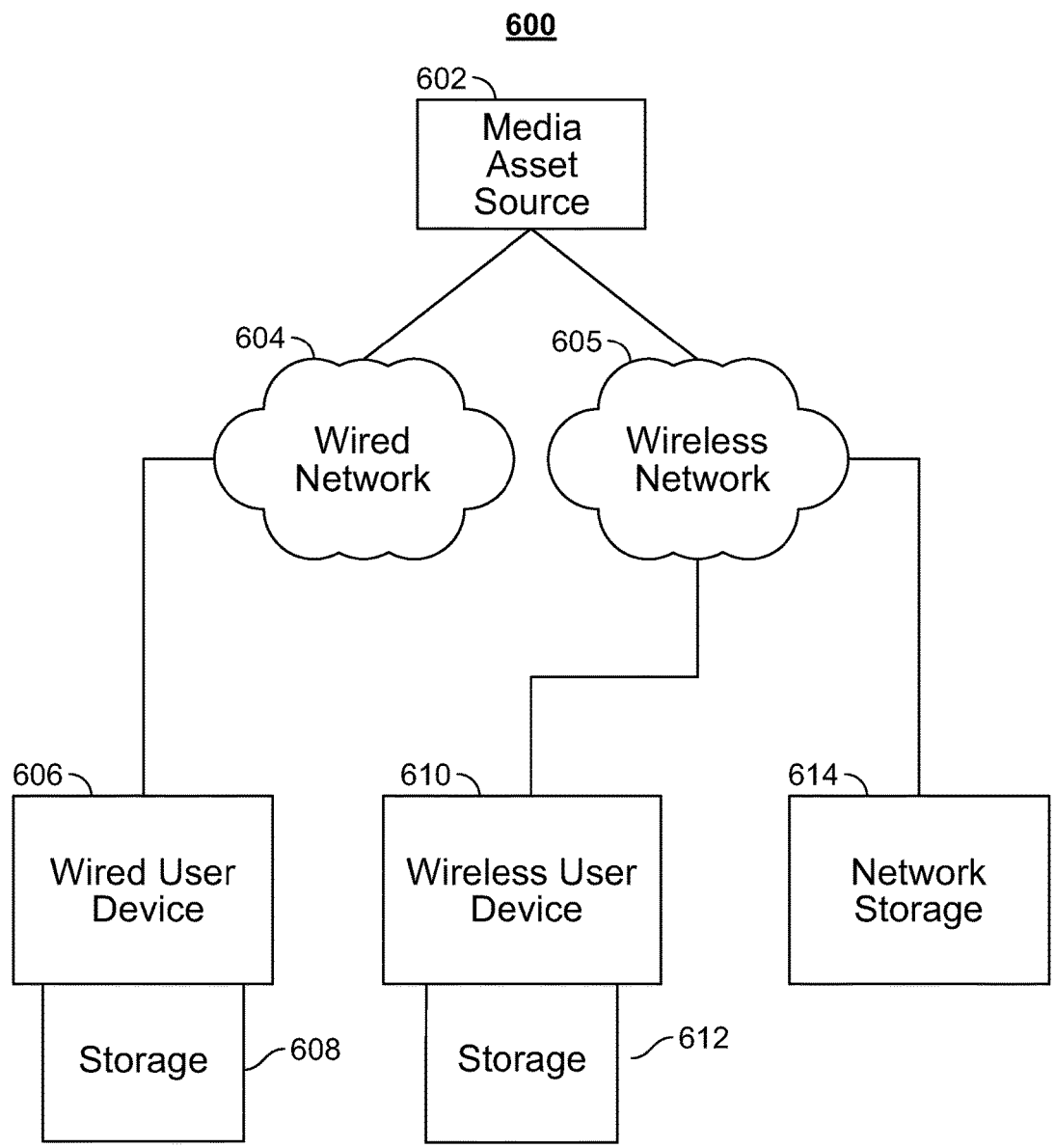
FIG. 6 is another block diagram of an illustrative media system in accordance with some embodiments of the disclosure.

FIG. 6 depicts block diagram of an illustrative media system in accordance with some embodiments of the disclosure. System 600 includes media asset source 602. In some embodiments, media asset source may be media content source 516. System 600 includes wired network 604 (e.g., cable TV network or wired Internet network) and wireless network 605 (e.g., Wi-Fi or cellular network). In some embodiments, wired network 604 and wireless network 605 may be a part of communications network 514.

System 600 includes wired user device 606 located at the user's home location (e.g., a combination of a TV and an STB) and a wireless user device 610 located outside of the user's home location (e.g., a smartphone or tablet). In some embodiments, user device 606 and wireless user device 610 may be a part of user television equipment 502, user computer equipment 504, and wireless user device 506. In some embodiments, wired user device 606 may have local storage device 608, and wireless user device 610 may have its reactive local storage 612.

In some embodiments, system 600 includes network storage 614. Network storage may be a single storage device or a plurality of storage devices (e.g., a cloud storage). In some embodiments, network storage 614 may be co-located with media asset source. In some embodiments, network storage 614 may be accessible via wireless network 605. In some embodiments, network storage 614 may also be accessible via wired network 604. In some embodiments, network storage may include one or more DVRs owned by the user.

In some embodiments, each of the components may have distinct advantages and disadvantages. For example, wired network 604, while fast, may only be accessible by the user via the wired user device 606, and be inaccessible by the user when the user is outside his or her home (e.g., via wireless user device 610). Wireless network 605 may be accessed by wireless user device 610 from multiple locations, but may be slow and/or have high latency. Furthermore, storage 608 and 612, while easily accessible by devices 606 and 610, respectively, may have limited space. Network storage 614 may have a large capacity, but may be accessed only with a relatively slow speed. In some embodiments, the user may have only a low amount of space available on network storage 614, e.g., because the user only has purchased a low-cost cloud plan.

In some embodiments, the media guidance application may detect that a user is accessing a media asset from media asset source 602. In some embodiments, the media guidance application may be configured to record the media asset (e.g., for later playback or for providing trick-play capability).

In some embodiments, the media guidance application may determine that the user is accessing the media asset using wireless user device 610 over wireless network 605. In this case, the media guidance application may determine whether the media asset features a set of scenes that increase a likelihood of using trick-play functions. If so, the media guidance application may store the media asset in storage 612. Such local storage is beneficial because user device 606 will now be able to quickly pause, rewind, and fast-forward the media asset without the need for further network access. In some embodiments, if the media asset does not feature such scenes, the media guidance application may store the media asset in network storage 614 (e.g., via wireless network 605). Such remote storage is beneficial because, since the user is unlikely to use trick-play capabilities, the latency inherent in remote access will not be problematic.

In some embodiments, the media guidance application may determine that the user is accessing the media asset using wired user device 606 over wired network 604. In this case, the media guidance application may determine, based on a user's access tendencies, a likelihood of the media asset being accessed on a second user device through the wireless connection. If the likelihood exceeds a threshold (e.g., 50% likelihood), the media guidance application may store the media asset in network storage 614. Such remote storage is beneficial because the user will now be able to access the media asset using other user devices (e.g., wireless user device 610). If the likelihood does not exceed the threshold, the media guidance application may store the media asset in storage 608. Such local storage is beneficial, because the user is unlikely to ever access this media asset using a wireless device (e.g., wireless user device 610), and thus cloud storage (which may be scarce) is not unnecessarily used up.

Figure 7:
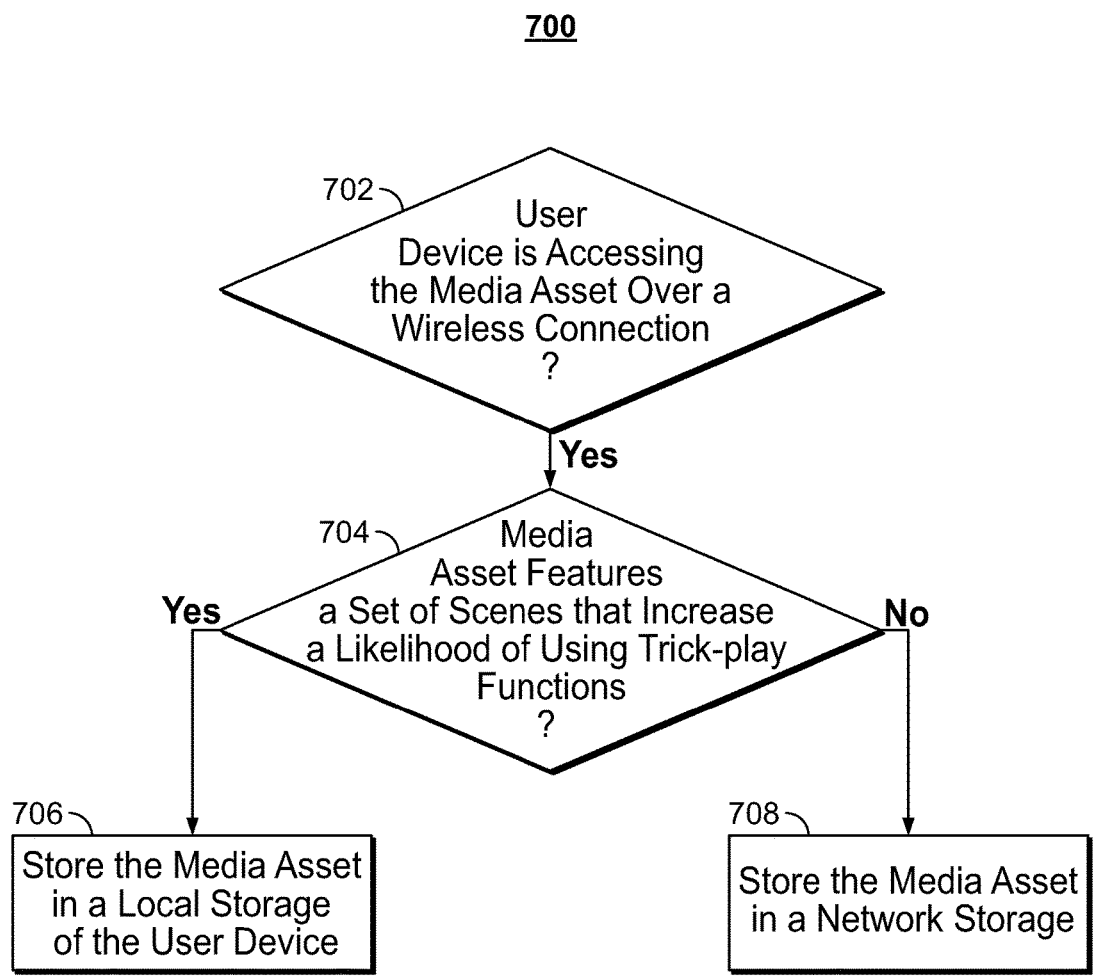
FIG. 7 depicts an illustrative flow diagram for a process of selecting a storage location for a media asset, in accordance with some embodiments of the disclosure.

FIG. 7 depicts an illustrative flow diagram of a process 700 for selecting a storage location for a media asset in accordance with an embodiment of the disclosure. Process 700 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 700 begins at 702, where control circuitry 404 determines whether a user device is accessing the media asset over a wireless connection or over a wired connection. For example, control circuitry 404 may examine the type of packets received by the user device. In another example, control circuitry 404 may simply determine if the user device is a wired device (e.g., wired user device 606) or a wireless device (wireless user device 610). If the user device is accessing the media asset over a wireless connection (e.g., wireless network 605), control circuitry 404 may proceed to step 704.

Process 700 continues at 704, where control circuitry 404 may determine whether the media asset features a set of scenes that increase a likelihood of using trick-play functions. For example, control circuitry 404 may determine whether the media asset features a high density of advisements, sports scenes (e.g., sports scores), or highly exciting scenes. If such scenes are present, control circuitry 404 may proceed to step 706; if not, control circuitry 404 may proceed to step 708.

At 706, control circuitry 404 may store the media asset in a local storage of the user device (e.g., in storage 612). For example, the media asset may be stored in a local memory of the user's smartphone.

At 706, control circuitry 404 may store the media asset in a network storage (e.g., in storage 614). For example, media asset may be stored in a cloud storage (e.g., in a cloud account associated with the user.)

Figure 8:
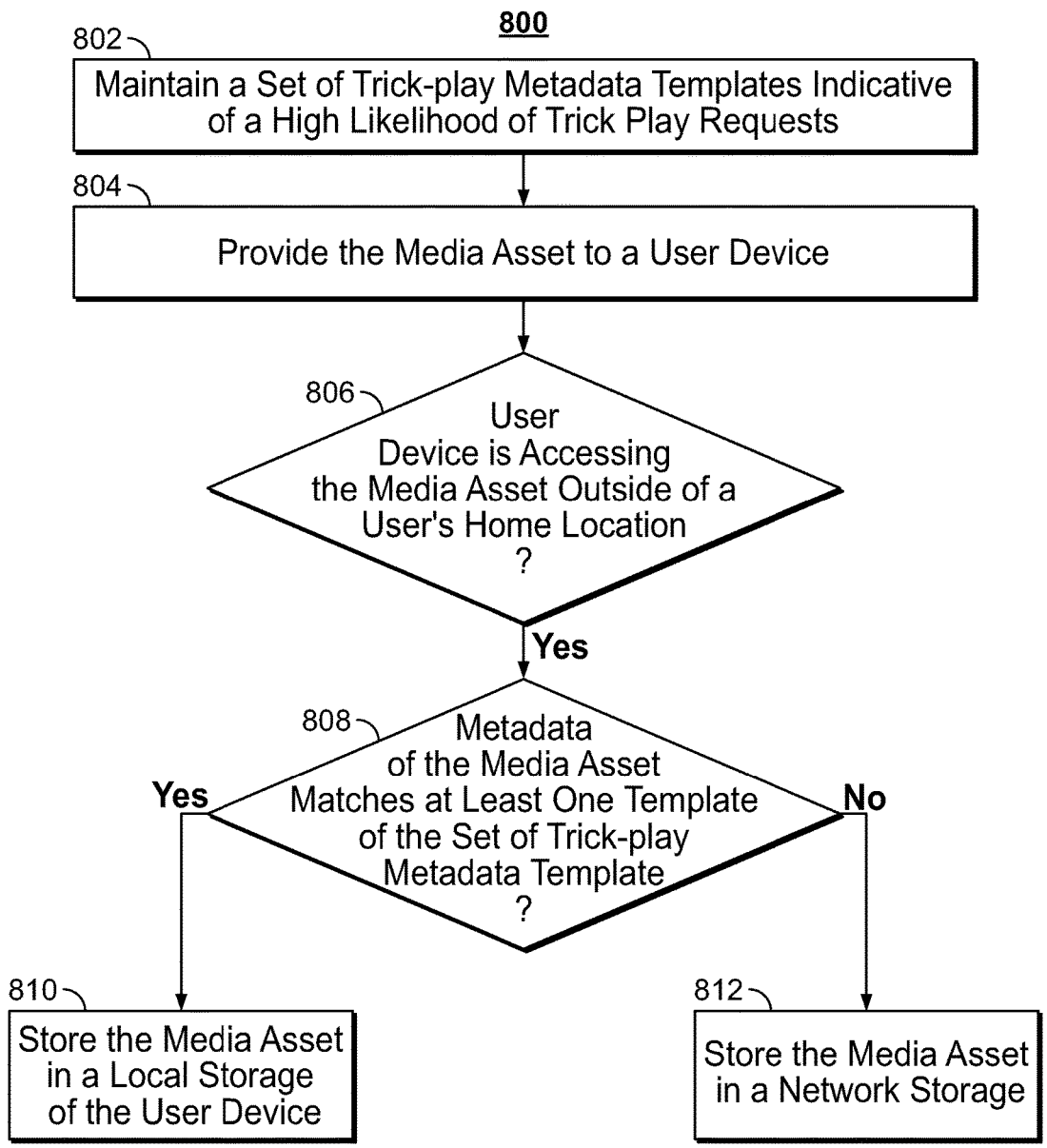
FIG. 8 depicts another illustrative flow diagram for a process of selecting a storage location for a media asset, in accordance with some embodiments of the disclosure.

FIG. 8 depicts an illustrative flow diagram of a process 800 for selecting a storage location for a media asset in accordance with an embodiment of the disclosure. Process 800 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 800 begins at 802, where control circuitry 404 maintains a set of trick-play metadata templates indicative of a high likelihood of trick-play requests. For example, one template may include keywords indicative of a large number of commercial interruptions. In some embodiments, such a template may include keywords "sale" or "lease," or other keywords indicative of advertisement content. In another example, a template may include keywords indicative of sports content (e.g., scoring event in sports). In some embodiments, such a template may include keywords "goal" or "touchdown," or other keywords indicative of sports content. In another example, a template may include keywords indicative of scenes found exciting by a plurality of other users. The keywords for such a template may be empirically determined. For example, control circuitry 404 may track which keywords in a plurality of media assets are associated with users activating trick-play functionalities.

Process 800 continues at 804, where control circuitry 404 may provide the media asset to a user device. For example, the media asset may be provided in response to a user request, or due to a regularly scheduled transmission.

Process 800 continues at 806, where control circuitry 404 determines whether a user device is accessing the media asset outside of the user's home location (e.g., over a wireless connection) or at the user's home location (e.g., over a wired connection). For example, control circuitry 404 may use location data (e.g., GPS data) provided by the user device to determine if the user device is at or outside of the user's home location. In another embodiment, control circuitry 404 may analyze the type of connection to make this determination. For example, if the media asset is being delivered over cable TV, or via home internet (e.g., via home Wi-Fi network of the user), control circuitry 404 may determine that the user device is accessing the media asset at the user's home location. Alternatively, if the media asset is being delivered over cellular network, or over internet network that is no the user's home network, control circuitry 404 may determine that the user device is accessing the media asset outside of the user's home location. In some embodiments, control circuitry 404 may examine the type of packets received by the user device to make the determination. In another example, control circuitry 404 may simply determine if the user device is a wired device (e.g., wired user device 604) or a wireless device (wireless user device 610). If the user device is accessing the media asset outside of the user's home location (e.g., over a wireless connection such as wireless network 605), control circuitry 404 may proceed to step 808.

Process 800 continues at 808, where control circuitry 404 determines whether the metadata of the media asset matches at least one template of the set of trick-play metadata templates. In one embodiment, metadata associated with the media asset (e.g., title, description, transcript, or any other metadata) may be linguistically compared to keywords of each template of the set of trick-play metadata templates. In some embodiments, the linguistic comparison may yield a percentage similarity score. If the percentage similarity score is sufficiently high (e.g., over 50%) for a given comparison, control circuitry 404 may determine that the metadata of the media set matches the respective trick-play metadata template. For example, if the media asset has a metadata transcript that includes a lot of words (e.g. more than a threshold amount) associated with advertising, the metadata of the media asset may be found to match the "advertisement" trick-play metadata template.

In some embodiments, in response to determining that the metadata of the media asset matches at least one template of the set of trick-play metadata templates, control circuitry 404 may proceed to step 810. In some embodiments, in response to determining that the metadata of the media asset does not match any templates of the set of trick-play metadata templates, control circuitry 404 may proceed to step 812.

At 810, control circuitry 404 may store the media asset in a local storage of the user device (e.g., in storage 612). For example, media asset may be stored in a local memory of the user's smartphone.

At 812, control circuitry 404 may store the media asset in a network storage (e.g., in storage 614). For example, media asset may be stored in a cloud storage (e.g., in a cloud account associated with the user.)

Figure 9:
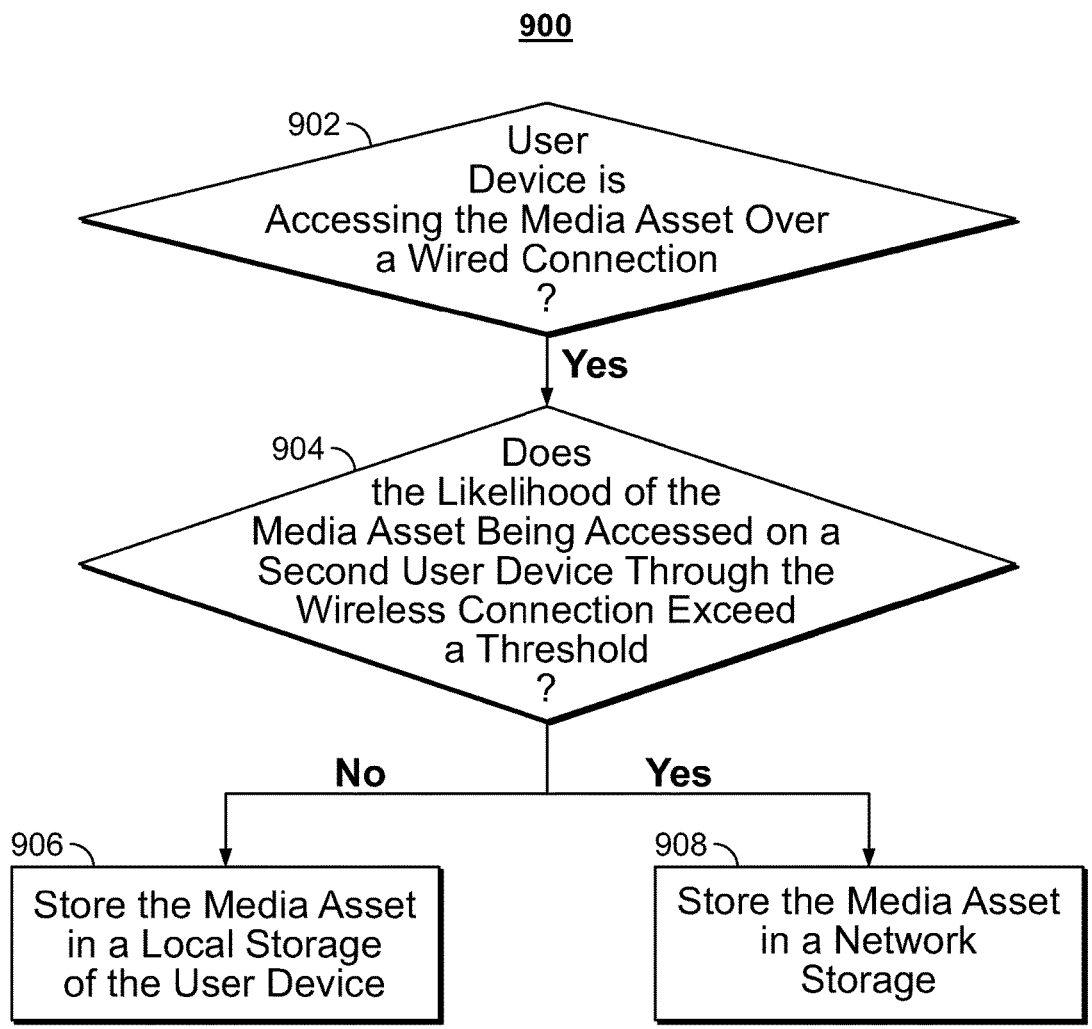
FIG. 9 depicts another illustrative flow diagram for a process of selecting a storage location for a media asset, in accordance with some embodiments of the disclosure

FIG. 9 depicts another illustrative flow diagram of a process 900 for selecting a storage location for a media asset in accordance with an embodiment of the disclosure. Process 900 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 900 begins at 902, where control circuitry 404 determines whether a user device is accessing the media asset over a wireless connection or over a wired connection. For example, control circuitry 404 may examine the type of packets received by the user device. In another example, control circuitry 404 may simply determine if the user device is a wired device (e.g., wired user device 604) or a wireless device (wireless user device 610). If the user device is accessing the media asset over a wired connection (e.g., wired network 604), control circuitry 404 may proceed to step 904.

At 904, control circuitry 404 may determine, based on a user's access tendencies, a likelihood of the media asset being accessed on a second user device through the wireless connection. In some embodiments, control circuitry 404 may have flagged a certain TV series that the user always watches over a wireless connection. For example, control circuitry 404 may have determined that the user watches 75% of episodes of the "Game of Thrones" series via a wireless device (e.g., wireless user device 610). In this case, control circuitry 404 may determine that any given episode of the "Game of Thrones" series may be watched by the user via a wireless device with 75% likelihood. In some embodiments, the likelihood may be determined by any other technique (e.g., by analyzing how often other users watch that media asset wirelessly).

In some embodiments, if the likelihood exceeds a threshold (e.g., 50%), control circuitry 404 may proceed to step 908. In some embodiments, if the likelihood does not exceed a threshold (e.g., 50%), control circuitry 404 may proceed to step 906.

At 906, control circuitry 404 may store the media asset in a local storage of the user device (e.g., in storage 612). For example, the media asset may be stored in a local memory of the user's smartphone.

At 908, control circuitry 404 may store the media asset in a network storage (e.g., in storage 614). For example, the media asset may be stored in a cloud storage (e.g., in a cloud account associated with the user.)

Figure 10:
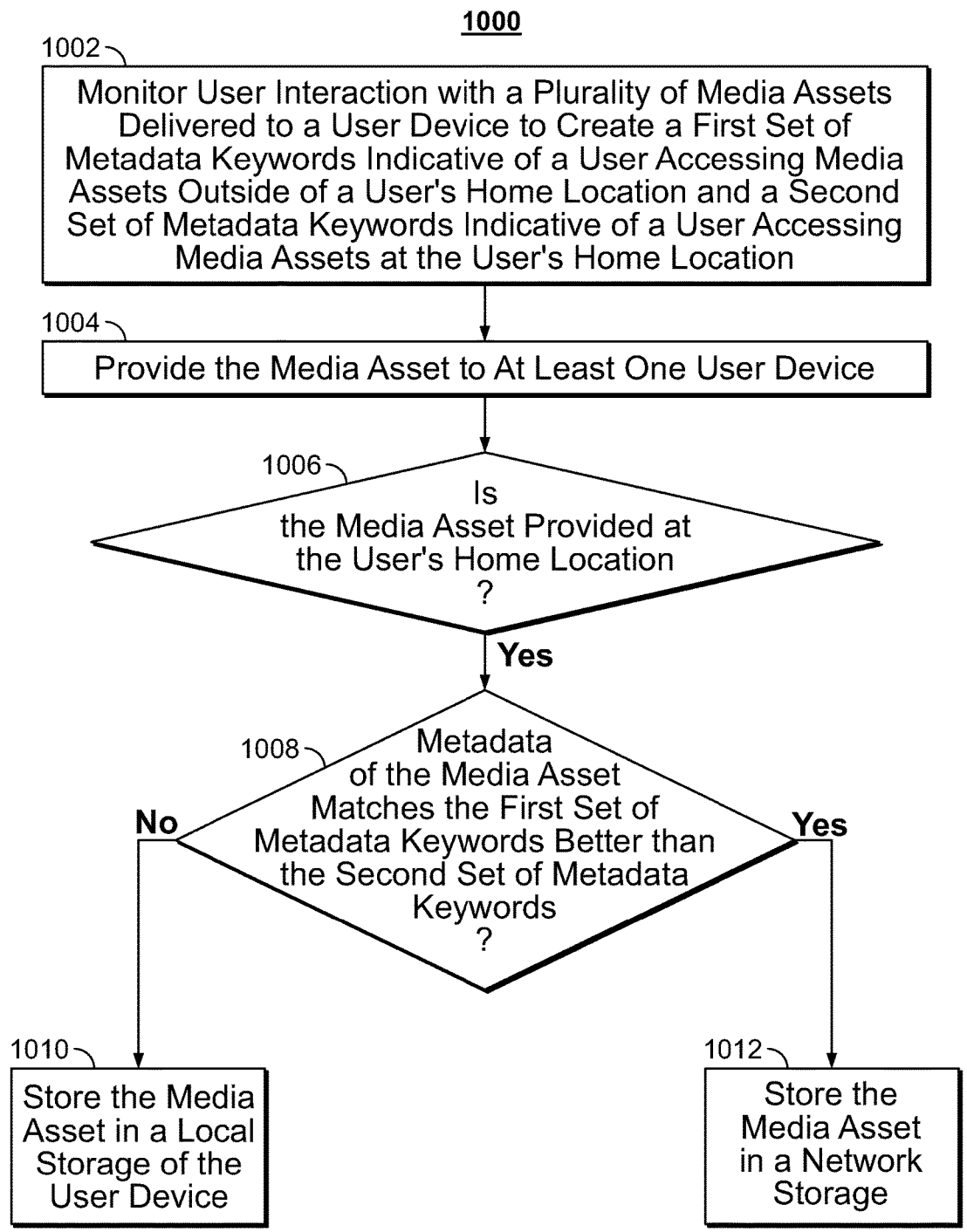
FIG. 10 depicts yet another illustrative flow diagram for a process of selecting a storage location for a media asset, in accordance with some embodiments of the disclosure.

FIG. 10 depicts yet another illustrative flow diagram of a process 1000 for selecting a storage location for a media asset in accordance with an embodiment of the disclosure. Process 1000 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 1000 begins at 1002, where control circuitry 404 monitors user interaction with a plurality of media assets delivered to at least one user device (e.g., one of user devices 606, 610) to create a first set of metadata keywords indicative of a user accessing media assets outside of the user's home location (e.g., over a wireless connection) and a second set of metadata keywords indicative of a user accessing media assets at the user's home location (e.g., over a wired connection). For example, every time the user requests a media asset over outside of the user's home location (e.g., a via wireless connection using wireless user device 610), control circuitry 404 may add the metadata of that media asset to the first set of metadata keywords. In another example, every time the user requests a media asset at the user's home location (e.g., over a wired connection) but fails to access that media asset outside of the user's home location (e.g., via a wireless connection) for a certain period of time (e.g., two weeks), the media guidance application may add the metadata of that media asset to the second set of metadata keywords.

Process 1000 continues at 1004, where control circuitry 404 may provide the media asset to a user device. For example, the media asset may be provided in response to a user request, or due to a regularly scheduled transmission.

Process 1000 continues at 1006, where control circuitry 404 determines whether a user device is accessing the media asset outside of the user's home location (e.g., over a wireless connection) or at the user's home location (e.g., over a wired connection). For example, control circuitry 404 may use location data (e.g., GPS data) provided by the user device to determine if the user device is at or outside of the user's home location. In another embodiment, control circuitry 404 may analyze the type of connection to make this determination. For example, if the media asset is being delivered over cable TV, or via home internet (e.g., via home Wi-Fi network of the user), control circuitry 404 may determine that the user device is accessing the media asset at the user's home location. Alternatively, if the media asset is being delivered over cellular network, or over internet network that is no the user's home network, control circuitry 404 may determine that the user device is accessing the media asset outside of the user's home location. In some embodiments, control circuitry 404 may examine the type of packets received by the user device. In another example, control circuitry 404 may simply determine if the user device is a wired device (e.g., wired user device 606) or a wireless device (wireless user device 610). If the at least one user device is accessing the media asset at the user's home location (e.g., over wired network 604), control circuitry 404 may proceed to step 1008.

Process 1000 continues at 1008, where control circuitry 404 may compare metadata of the media asset to the first set of metadata keywords and to the second set of metadata keywords. For example, control circuitry 404 may perform linguistic similarity analysis that returns a percentage similarity score. For example, control circuitry 404 may determine that metadata of the media asset is 5% similar to the first set of metadata keywords and 10% similar to the second set of metadata keywords. In some embodiments, in response to determining that metadata of the media asset matches the first set of metadata keywords better than the second set of metadata keywords (e.g., has a higher similarity score), control circuitry 404 proceeds to step 1012. In some embodiments, in response to determining that metadata of the media asset matches the second set of metadata keywords better than the first set of metadata keywords, control circuitry 404 proceeds to steps 1010.

At 1010, control circuitry 404 may store the media asset in a local storage of the user device (e.g., in storage 612). For example, media asset may be stored in a local memory of the user's smartphone.

At 1012, control circuitry 404 may store the media asset in a network storage (e.g., in storage 614). For example, media asset may be stored in a cloud storage (e.g., in a cloud account associated with the user.)

Figure 11:
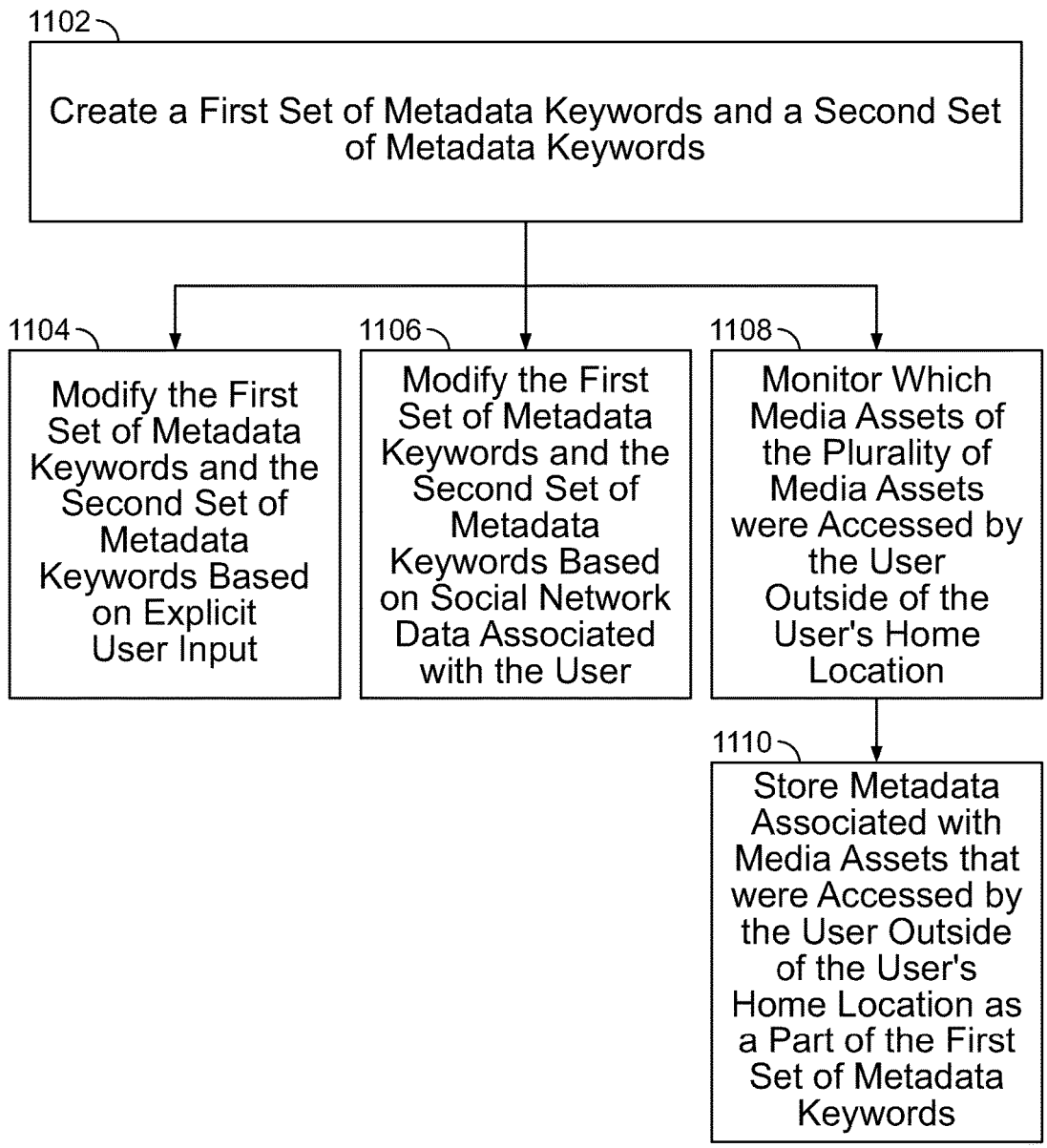
FIG. 11 depicts an illustrative flow diagram for a process of creating sets of metadata keywords, in accordance with some embodiments of the disclosure.

FIG. 11 depicts an illustrative flow diagram of a process 1100 for a process of creating sets of metadata keywords in accordance with an embodiment of the disclosure. Process 1100 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514.

Process 1100 begins at 1102, where control circuitry 404 may create a first set of metadata keywords indicative of a user accessing media assets outside of the user's locating (e.g., over a wireless connection) and a second set of metadata keywords indicative of a user accessing media assets at the user's home location (e.g., over a wired connection). For example, step 1102 may be performed as part of step 1002. In some embodiments, control circuitry 404 may perform steps 1104, 1106, and/or 1008-1100 as part of step 1102. In some embodiments, one, some or all of steps 1104, 1106, 1008-1100 may be performed by control circuitry 404. Steps 1104, 1106, and/or 1008-1100 may be performed individually, simultaneously, consecutively, or in any other order.

At 1104, control circuitry 404 may modify the first set of metadata keywords and the second set of metadata keywords based on explicit user input. For example, control circuitry 404 may receive explicit input from the user that certain types of media assets should be stored in a network storage. For example, the user may request that episodes of the show "Game of Thrones" be stored on a network storage. In some embodiments, control circuitry 404 may modify the first set of metadata keywords to include the keywords "Game of Thrones."

At 1106, control circuitry 404 may modify the first set of metadata keywords and the second set of metadata keywords based on social network data associated with the user. For example, control circuitry 404 may acquire a social network post history of the user. In some embodiments, control circuitry 404 may then analyze the post history to identify keywords associated with accessing media asset outside of the user's home location (e.g. wirelessly). For example, if a post includes a line "I always put on SpongeBob to entertain my kids on road trips," the media guidance application may add keywords "SpongeBob" and "Cartoons" to the first set of metadata keywords.

At 1108, control circuitry 404 may monitor which media assets of the plurality of media assets were accessed by the user outside of the user's home location (e. g. wirelessly from wireless user device 610). For example, control circuitry 404 may determine that the user has accessed an episode of "Game of Thrones" wirelessly via a wireless user device (e.g., wireless user device 610).

At 1110, control circuitry 404 may store metadata associated with media assets that were accessed by the user outside of the user's home location (e.g. wirelessly) as a part of the first set of metadata keywords. For example, control circuitry 404 may store keywords "game of thrones" to the first set of metadata keywords.

Figure 12:
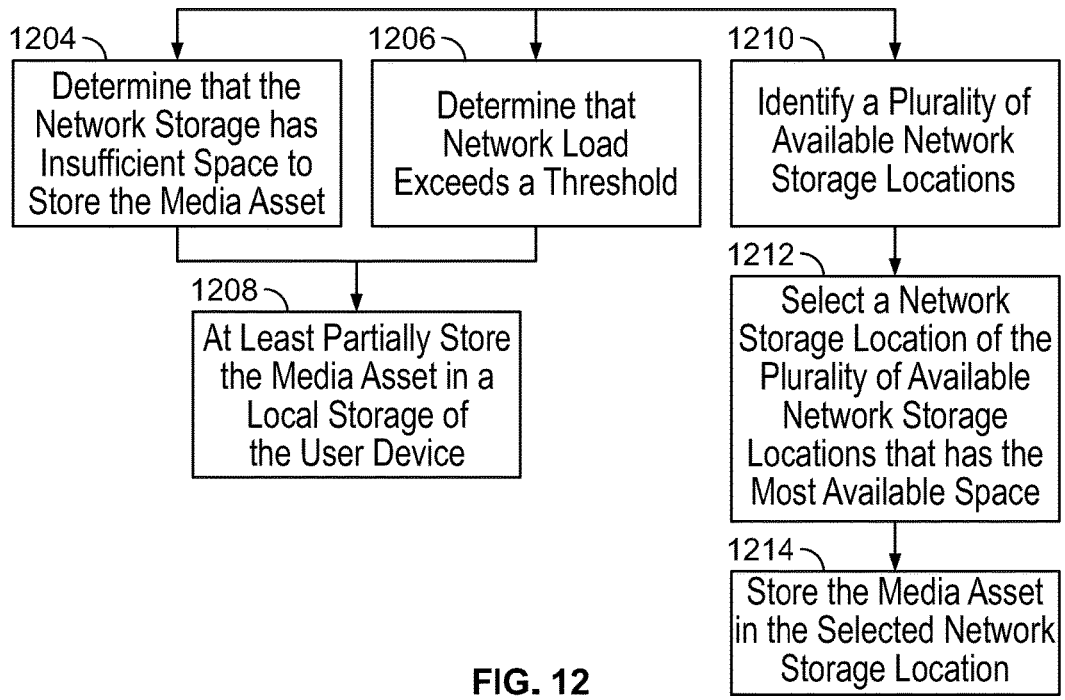
FIG. 12 depicts an illustrative flow diagram for a process of modifying a selection of a storage location for a media asset, in accordance with some embodiments of the disclosure.

FIG. 12 depicts an illustrative flow diagram of a process 1200 for modifying a selection of a storage location for a media asset in accordance with an embodiment of the disclosure. Process 1200 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, steps of process 1200 may be performed in response to one of steps 704, 808, 904, or 1008.

In some embodiments, steps of process 1200 may be performed in response to determining that the metadata of the media asset does not match any templates of the set of trick-play metadata. In some embodiments, steps of process 1200 may be performed in response to determining that metadata of the media asset matches the first set of metadata keywords better than the second set of metadata keywords. In some embodiments, steps of process 1200 may performed in response to determining that the media asset does not feature the set of scenes that increase the likelihood of using trick-play functions. In some embodiments, steps of process 1200 may be performed in response to determining that the likelihood of the media asset being accessed outside of user's home location (e.g. on a wireless user device through the wireless connection) is greater than the threshold.

In some embodiments, control circuitry 404 may perform some or all of steps 1204-1208 and 1206-108. In some embodiments, steps 1204-1208 and 1206-108 may be performed by control circuitry 404 individually, simultaneously, consecutively, or in any other order.

At 1204, control circuitry 404 may determine that while storage of a media asset in the network storage (e.g., network storage 614) would be preferable, the network storage lacks sufficient space for the request. For example, the user may have a cloud storage account that has 100 MB of space left, while storing the media asset may require 150

MB. In some embodiments, if such a determination is made, control circuitry 404 may proceed to step 1208.

At 1206, control circuitry 404, may determine that while storage of a media asset in the network storage (e.g., network storage 614) would be preferable, the network (e.g., of wireless network 605) load currently exceeds a threshold. For example, control circuitry 404 may determine that the load of the network is too high to support a transfer of data to the network storage. In some embodiments, if such a determination is made, control circuitry 404 may proceed to step 1208.

At 1208, control circuitry 404 may at least partially store the media asset in a local storage of the user device. For example, if the entirety of the media asset cannot be stored in the network storage, control circuitry 404 may at least partially store the media asset in the local storage (e.g., at storage 608 or storage 612).

At 1210, control circuitry 404 may determine that a plurality of network storage location may be available for storing the media asset. For example, control circuitry 404 may determine that the user has access to several DVR devices (e.g. by the virtue of having a multi-room DVR system), where each DVR device can act as a network storage device.

At 1210, control circuitry 404 may select a network storage location of the plurality of available network storage locations that has the most available space. For example, if the first DVR has 1 GB of space while the second DVR has 1.5 GB of space, control circuitry 404 may select the first DVR.

At 1210, control circuitry 404 may store the media asset in the selected network storage location. For example, control circuitry 404 may store the media asset at the first DVR.

Figure 13:
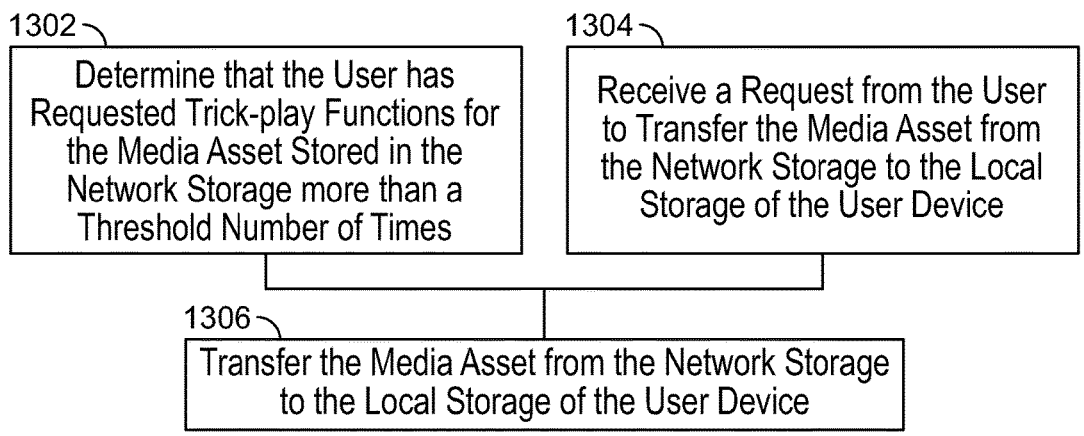
FIG. 13 depicts an illustrative flow diagram for a process of transferring a media asset between storage locations, in accordance with some embodiments of the disclosure.

FIG. 13 depicts an illustrative flow diagram of a process 1200 for transferring a media asset between storage locations in accordance with an embodiment of the disclosure. Process 1300 may be executed by control circuitry 404 (e.g., in a manner instructed to control circuitry 404 by the media guidance application). Control circuitry 404 may be a part of user equipment (e.g., user television equipment 502, user computer equipment 504, and/or wireless communications device 506), or of a remote server separated from the user equipment by way of communications network 514. In some embodiments, steps of process 1300 may be performed in response to one of steps 708n 812, 908, or 1012. In some embodiments, control circuitry 404 may execute the steps of process 1300 when the media storage is already stored in network storage (e.g., network storage 614).

In some embodiments, control circuitry 404 may perform some or all of steps 1302-1306 or 1304-1306. In some embodiments, steps 1302-1306 or 1304-1306 may be performed by control circuitry 404 individually, simultaneously, consecutively, or in any other order.

At 1302, control circuitry 404 may determine that the user has requested trick-play functionality for the media asset stored in the network storage more than a threshold number of times. For example, a media asset may already be stored in a network storage (e.g., network storage 614). However, the user may have decided to request trick-play functionalities in connection with that media asset. In some embodiments, the threshold for such request may be set at two (or at any other number.) For example, if the user has requested a rewind of the media asset more than twice, control circuitry 404 may proceed to step 1306.

At 1304, control circuitry 404 may receive a request from the user to transfer the media asset from the network storage to the local storage of the user device. For example, the user may wish to store a particular movie or a TV show locally. In response, control circuitry 404 may proceed to step 1306.

At 1306, control circuitry 404 may transfer the media asset from the network storage to the local storage of the user device. For example, a media asset may be transferred from network storage (e.g., network storage 614) to local storage of the user device (e.g., storage 608 or 612).

It is contemplated that the steps or descriptions of each of FIGS. 7-13 may be used with any other embodiment of this disclosure. It is contemplated that some steps or descriptions of each of FIGS. 7-13 may be optional and may be omitted in some embodiments. In addition, the steps and descriptions described in relation to FIGS. 7-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-6 could be used to perform one or more of the steps in FIGS. 7-13.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, media guidance data source 518, media asset source 602, wired user device 608, wireless user device 610, or network storage 614.

The processes discussed above in FIGS. 7-13 are intended to be illustrative and not limiting. One skilled in the art would appreciate that the steps of the processes in FIGS. 7-13 discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for selecting storage location for a media asset, the method comprising:

monitoring user interaction with a plurality of media assets delivered to at least one user device to create a first set of metadata keywords indicative of a user accessing media assets outside of a user's home location and a second set of metadata keywords indicative of the user accessing media assets at the user's home location;

providing the media asset to the at least one user device;

determining whether the media asset is being provided at the user's home location or outside of the user's home location; and in response to determining that the user device is accessing the media asset at the user's home location:

comparing metadata of the media asset to the first set of metadata keywords and to the second set of metadata keywords;

in response to determining that metadata of the media asset matches the first set of metadata keywords better than the second set of metadata keywords, storing the media asset in a network storage;

in response to determining that metadata of the media asset matches the second set of metadata keywords better than the first set of metadata keywords, storing the media asset in a local storage of the first user device.

2. The method of claim 1, wherein monitoring user interaction with a plurality of media assets delivered to the at least one user device comprises:

monitoring which media assets of the plurality of media assets were accessed by the user outside of the user's home location; and storing metadata associated with media assets that were accessed by the user outside of the user's home location as a part of the first set of metadata keywords.

3. The method of claim 1, further comprising, in response to determining that metadata of the media asset matches the first set of metadata keywords better than the second set of metadata keywords:

determining that the network storage has insufficient space to store the media asset; and in response to determining that the network storage has insufficient space to store the media asset, at least partially storing the media asset in a local storage of the user device.

4. The method of claim 1, further comprising, in response to determining that metadata of the media asset matches the first set of metadata keywords better than the second set of metadata keywords:

determining that network load exceeds a threshold; and in response to determining that the network load exceeds a threshold, at least partially storing the media asset in a local storage of the user device.

5. The method of claim 1, further comprising:

determining that the user has requested trick-play functions for the media asset stored in the network storage more than a threshold number of times; and in response to determining that the user has requested trick-play functions for the media asset more than the threshold number of times, transferring the media asset from the network storage to the local storage of the user device.

6. The method of claim 1, further comprising:

receiving a request from the user to transfer the media asset from the network storage to the local storage of the user device; and in response to receiving the request, transferring the media asset from the network storage to the local storage of the user device.

7. The method of claim 1, further comprising, in response to determining that metadata of the media asset matches the first set of metadata keywords better than the second set of metadata keywords:

identifying a plurality of available network storage locations;

selecting a network storage location of the plurality of available network storage locations that has the most available space; and storing the media asset in the network storage location.

8. The method of claim 1, further comprising:

modifying the first set of metadata keywords and the second set of metadata keywords based on explicit user input.

9. The method of claim 1, further comprising:

modifying the first set of metadata keywords and the second set of metadata keywords based on social network data associated with the user.

10. The method of claim 1, wherein the network storage is a cloud network storage.

11. A system for selecting storage location for a media asset, the system comprising:

control circuitry configured to:

monitor user interaction with a plurality of media assets delivered to at least one user device to create a first set of metadata keywords indicative of a user accessing media assets outside of a user's home location and a second set of metadata keywords indicative of the user accessing media assets at the user's home location;

provide the media asset to the at least one user device;

determine whether the media asset is being provided at the user's home location or outside of the user's home location; and in response to determining that the user device is accessing the media asset at the user's home location:

compare metadata of the media asset to the first set of metadata keywords and to the second set of metadata keywords;

in response to determining that metadata of the media asset matches the first set of metadata keywords better than the second set of metadata keywords, store the media asset in a network storage;

in response to determining that metadata of the media asset matches the second set of metadata keywords better than the first set of metadata keywords, store the media asset in a local storage of the first user device.

12. The system of claim 11, wherein the control circuitry is configured to monitor user interaction with a plurality of media assets delivered to a user device by:

monitoring which media assets of the plurality of media assets were accessed by the user outside of the user's home location; and storing metadata associated with media assets that were accessed by the user outside of the user's home location as a part of the first set of metadata keywords.

13. The system of claim 11, wherein the control circuitry is further configured to, in response to determining that metadata of the media asset matches the first set of metadata keywords better than the second set of metadata keywords:

determining that the network storage has insufficient space to store the media asset; and in response to determining that the network storage has insufficient space to store the media asset, at least partially storing the media asset in a local storage of the user device.

14. The system of claim 11, wherein the control circuitry is further configured to, in response to determining that metadata of the media asset matches the first set of metadata keywords better than the second set of metadata keywords:

determine that network load exceeds a threshold; and in response to determining that the network load exceeds a threshold, at least partially store the media asset in a local storage of the user device.

15. The system of claim 11, wherein the control circuitry is further configured to:

determine that the user has requested trick-play functions for the media asset stored in the network storage more than a threshold number of times; and in response to determining that the user has requested trick-play functions for the media asset more than the threshold number of times, transfer the media asset from the network storage to the local storage of the user device.

16. The system of claim 11, wherein the control circuitry is further configured to:

receive a request from the user to transfer the media asset from the network storage to the local storage of the user device; and in response to receiving the request, transfer the media asset from the network storage to the local storage of the user device.

17. The system of claim 11, wherein the control circuitry is further configured to, in response to determining that metadata of the media asset matches the first set of metadata keywords better than the second set of metadata keywords:

identify a plurality of available network storage locations;

select a network storage location of the plurality of available network storage locations that has the most available space; and store the media asset in the network storage location.

18. The system of claim 11, wherein the control circuitry is further configured to:

modify the first set of metadata keywords and the second set of metadata keywords based on explicit user input.

19. The system of claim 11, wherein the control circuitry is further configured to:

modify the first set of metadata keywords and the second set of metadata keywords based on social network data associated with the user.

20. The system of claim 11, wherein the network storage is a cloud network storage.

* * * * *